United States Patent
Kimura

(10) Patent No.: US 10,434,919 B2
(45) Date of Patent: Oct. 8, 2019

(54) VEHICLE SEAT

(71) Applicant: TOYOTA BOSHOKU KABUSHIKI KAISHA, Aichi-ken (JP)

(72) Inventor: Koji Kimura, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 15/970,154

(22) Filed: May 3, 2018

(65) Prior Publication Data
US 2018/0339629 A1    Nov. 29, 2018

(30) Foreign Application Priority Data

May 25, 2017    (JP) .................................. 2017-103847

(51) Int. Cl.
*A47C 7/50*     (2006.01)
*B64D 11/06*    (2006.01)
(Continued)

(52) U.S. Cl.
CPC ............. *B60N 2/995* (2018.02); *B60N 2/686* (2013.01); *B64D 11/0643* (2014.12); *A47C 7/5066* (2018.08); *B60N 2/3047* (2013.01)

(58) Field of Classification Search
CPC .......... B60N 2/62; B60N 2/686; B60N 2/995; A47C 7/50; A47C 7/506; A47C 7/5066; B64D 11/0643
See application file for complete search history.

(56) References Cited

U.S. PATENT DOCUMENTS

| | | | | |
|---|---|---|---|---|
| 4,589,696 A | * | 5/1986 | Kanai | .................. B60N 2/00 297/284.11 |
| 6,095,610 A | * | 8/2000 | Okajima | ................ B60N 2/995 297/423.36 |

(Continued)

FOREIGN PATENT DOCUMENTS

| | | | |
|---|---|---|---|
| EP | 1147939 A2 | * 10/2001 | ............... B60N 2/62 |
| JP | 2010-260537 | 11/2010 | |

(Continued)

OTHER PUBLICATIONS

U.S. Appl. No. 15/970,140 to Koji Kimura, filed May 3, 2018.

*Primary Examiner* — Ryan D Kwiecinski
(74) *Attorney, Agent, or Firm* — Greenblum & Bernstein, P.L.C.

(57) ABSTRACT

The seat cushion includes side frames and an ottoman support portion provided at front end portions of the side frames. The ottoman support portion is arranged between the side frames. The ottoman support portion includes an upper member, a lower member, and a mount connected to the lower member and provided with the ottoman. The upper member includes a first side portion connected to the side frame, a second side portion connected to the side frame, and a connection portion provided between the first side portion and the second side portion. The lower member includes a third side portion connected to the side frame, a fourth side portion connected to the side frame, and a connection portion provided between the third side portion and the fourth side portion. The connection portion of the upper member and the connection portion of the lower member are connected to each other.

4 Claims, 5 Drawing Sheets

(51) Int. Cl.
    *B60N 2/68*     (2006.01)
    *B60N 2/90*     (2018.01)
    *B60N 2/30*     (2006.01)

(56) References Cited

U.S. PATENT DOCUMENTS

| | | | |
|---|---|---|---|
| 8,251,425 B2 | 8/2012 | Jungert et al. | |
| 8,444,226 B2 * | 5/2013 | Driessen | B60N 3/063 |
| | | | 297/423.28 |
| 8,579,373 B2 * | 11/2013 | Pradier | B60N 2/0232 |
| | | | 297/284.11 |
| 9,963,055 B2 * | 5/2018 | Seo | B60N 2/995 |
| 2009/0096272 A1 * | 4/2009 | Okano | B60N 2/995 |
| | | | 297/423.3 |
| 2010/0283282 A1 | 11/2010 | Jungert et al. | |
| 2015/0284092 A1 * | 10/2015 | Wilkey | B60N 2/919 |
| | | | 297/423.29 |
| 2015/0306978 A1 * | 10/2015 | Watanabe | B60N 2/06 |
| | | | 297/344.1 |
| 2016/0339820 A1 * | 11/2016 | Kajino | B60N 2/995 |
| 2017/0318971 A1 * | 11/2017 | Kim | B60N 2/995 |
| 2018/0290566 A1 * | 10/2018 | Sera | B60N 2/995 |
| 2018/0338620 A1 * | 11/2018 | Katori | B60N 2/90 |
| 2018/0339628 A1 * | 11/2018 | Kimura | B60N 2/995 |
| 2019/0077283 A1 * | 3/2019 | Kimura | B60N 2/3045 |

FOREIGN PATENT DOCUMENTS

| | | | |
|---|---|---|---|
| JP | 2013-112128 | 6/2013 | |
| JP | 6119638 B2 * | 4/2017 | |
| WO | WO-2006011244 A1 * | 2/2006 | B60N 2/995 |

\* cited by examiner

VEHICLE SEAT

This nonprovisional application is based on Japanese Patent Application No. 2017-103847 filed with the Japan Patent Office on May 25, 2017, the entire contents of which are hereby incorporated by reference.

BACKGROUND

Field

The present disclosure relates to a vehicle seat and particularly to a vehicle seat with an ottoman.

Description of the Background Art

Various vehicle seats have conventionally been proposed (see Japanese Patent Laying-Open No. 2010-260537) and for example, various vehicle seats with ottoman have also been proposed.

In general, the vehicle seat with ottoman includes a seat back, a seat cushion, and an ottoman. The ottoman is provided on a side of a front end portion of the seat cushion. The ottoman is provided as being movable between a storage position below the front end portion of the seat cushion and a developed position in front of the seat cushion.

For example, a vehicle seat described in Japanese Patent Laying-Open No. 2013-112128 includes a seat cushion which can be tipped up and an ottoman provided at a front end portion of the seat cushion.

SUMMARY

In a vehicle seat with an ottoman, a seat cushion includes a cushion frame and a cushion pad provided on the cushion frame. The cushion frame includes a left side frame and a right side frame arranged at a distance from each other in a lateral direction and an ottoman support portion which supports the ottoman.

The ottoman support portion includes an upper member and a lower member arranged between the side frames and a mount connected to the lower member and provided with the ottoman. The upper member and the lower member are arranged at a distance from each other in a vertical direction.

The upper member has opposing ends in a direction of width of a seat connected to respective side frames. The lower member is arranged below the upper member at a distance therefrom and the lower member has opposing ends in the direction of width of the seat connected to respective side frames. The mount provided with the ottoman is connected to the lower member.

A load imposed by a self weight of the ottoman is applied to the mount. Since the mount is connected to the lower member, the lower member and the side frames bear the self weight of the ottoman. Consequently, the lower member supported at opposing ends may significantly be deformed.

The present disclosure was made in view of the problem as described above and an object thereof is to provide a vehicle seat in which deformation of an ottoman support member is suppressed.

A vehicle seat according to the present disclosure includes a seat cushion which supports an occupant and an ottoman provided on a front side of the seat cushion. The seat cushion include's a first side frame and a second side frame arranged at a distance from each other in a direction of width of the seat and an ottoman support portion provided between the first side frame and the second side frame on a side of front end portions of the first side frame and the second side frame. The ottoman support portion includes an upper member, a lower member arranged below the upper member at a distance from the upper member, and a mount connected to the lower member and provided with the ottoman. The upper member includes a first side portion connected to the first side frame, a second side portion connected to the second side frame, and a first connection portion provided between the first side portion and the second side portion. The lower member includes a third side portion connected to the first side frame, a fourth side portion connected to the second side frame, and a second connection portion provided between the third side portion and the fourth side portion. The first connection portion of the upper member and the second connection portion of the lower member are connected to each other.

According to the vehicle seat, the upper member and the lower member are connected to each other with the first connection portion and the second connection portion being interposed.

Therefore, a self weight of the ottoman applied to the lower member is transmitted not only to the lower member but also to the upper member through the first connection portion and the second connection portion. The lower member and the upper member are supported by the first side frame and the second side frame. Thus, the lower member is supported not only by the first side frame and the second side frame but also by the upper member so that large deformation of the lower member is suppressed.

The foregoing and other objects, features, aspects and advantages of the present disclosure will become more apparent from the following detailed description when taken in conjunction with the accompanying drawings.

DESCRIPTION OF THE PREFERRED EMBODIMENTS

Figure 1:
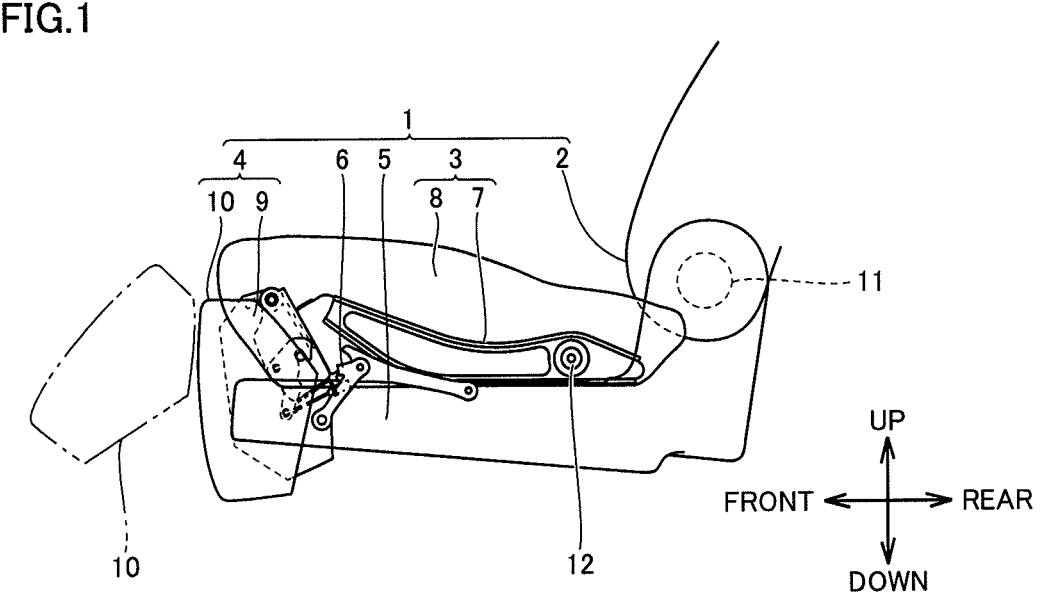
FIG. 1 is a side view schematically showing a vehicle seat 1.

A vehicle seat according to the present embodiment will be described with reference to FIGS. 1 to 8. The same or substantially the same features among features shown in FIGS. 1 to 8 have the same reference characters allotted and redundant description may not be provided.

"Right" shown in FIG. 1 and the like represents a direction on the right of an occupant who sits on a vehicle seat 1. "Left" represents a direction on the left of the occupant who sits on vehicle seat 1. Similarly, "up" or "upper" represents an upward direction and "down", "lower", or "below" represents a downward direction. "Front" or "forward" represents a forward direction and "rear" represents a rearward direction. A direction of width of the seat means a lateral direction and a direction of front and rear of the seat means a front-rear direction.

FIG. 1 is a side view schematically showing vehicle seat 1. Vehicle seat 1 includes a seat back 2, a seat cushion 3, an ottoman 4, a base 5, and an operation link 6.

Base 5 is arranged on an upper surface of a floor panel of a vehicle. A slider is provided on the floor panel and base 5 is provided on the slider. Base 5 is provided as being movable in the front-rear direction of the vehicle by means of the slider.

Seat back 2 is provided on an upper surface of base 5. Seat back 2 includes a back frame and a back pad. The back pad is arranged on a side of an upper surface of the back frame. Seat back 2 functions as a backrest for an occupant. Seat back 2 is provided on base 5 as being pivotable around a recliner 11 provided on a side of a lower end portion of the back frame.

Seat cushion 3 includes a cushion frame 7 and a cushion pad 8. Cushion pad 8 is arranged on a side of an upper surface of cushion frame 7. Seat cushion 3 functions as a seat portion for an occupant. Cushion frame 7 is provided as being pivotable around a shaft 12 with respect to base 5. Shaft 12 is provided on a side of a rear end of cushion frame 7.

Ottoman 4 is provided in front of seat cushion 3 and specifically provided on a side of a front end portion of cushion frame 7. Ottoman 4 includes a fixed portion 9, an ottoman main body 10, and a link mechanism and a locking mechanism which are not shown. Fixed portion 9 is fixed to a tip end portion of cushion frame 7.

Ottoman main body 10 is a member which supports calves of an occupant. Ottoman main body 10 is provided as being movable with respect to fixed portion 9 and provided to be movable between a storage position and a developed position. The storage position where ottoman main body 10 is stored is located below seat cushion 3. The developed position where ottoman main body 10 is developed is located on a front side of seat cushion 3 and shown with a chain double dotted line in FIG. 1.

The link mechanism is a mechanism which moves ottoman main body 10 between the storage position and the developed position. The locking mechanism is a mechanism which fixes ottoman main body 10 to fixed portion 9 or cancels the fixed state of ottoman main body 10.

Operation link 6 is provided to connect base 5 and fixed portion 9 to each other. Vehicle seat 1 according to the present embodiment includes a tip-up mechanism and an operation portion. When the operation portion is operated, the tip-up mechanism moves seat cushion 3 located at a position for use as a seat as shown in FIG. 1 to a tipped-up position as shown in FIG. 2 and tilts seat back 2 forward.

Figure 2:
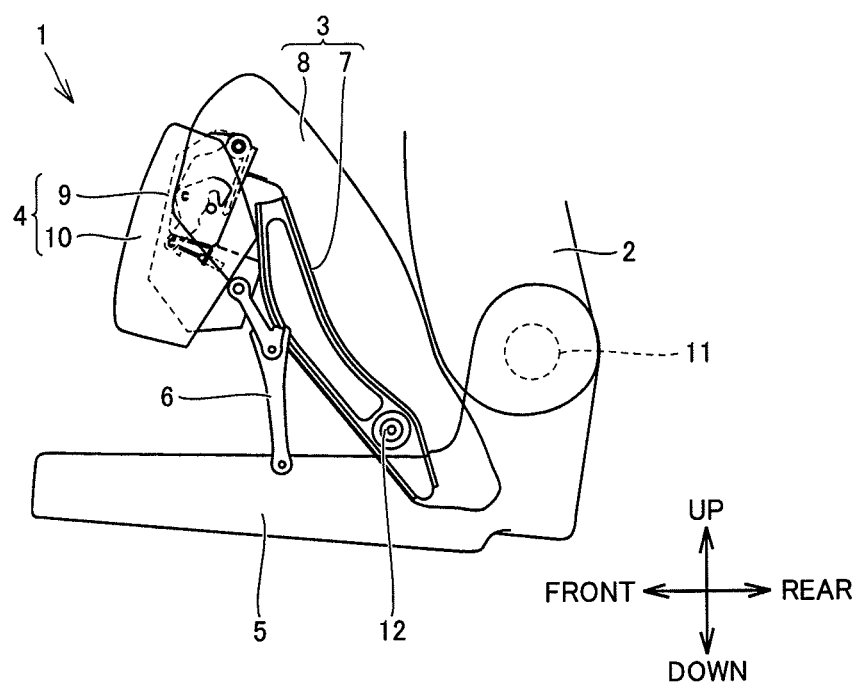
FIG. 2 is a side view showing vehicle seat 1 while a seat cushion 3 is located at a tipped-up position.

FIG. 2 is a side view showing vehicle seat 1 while seat cushion 3 is located at a tipped-up position.

Operation link 6 moves ottoman 4 toward a lower surface of seat cushion 3 in a process of movement of seat cushion 3 from the position for use as a seat to the tipped-up position. Vehicle seat 1 can be compact by moving ottoman 4 toward the lower surface of seat cushion 3 when seat cushion 3 is moved to the tipped-up position.

A large space can be created in a rear portion of a compartment by moving vehicle seat 1 forward while seat back 2 is tilted forward and seat cushion 3 is moved to the tipped-up position.

Figure 3:
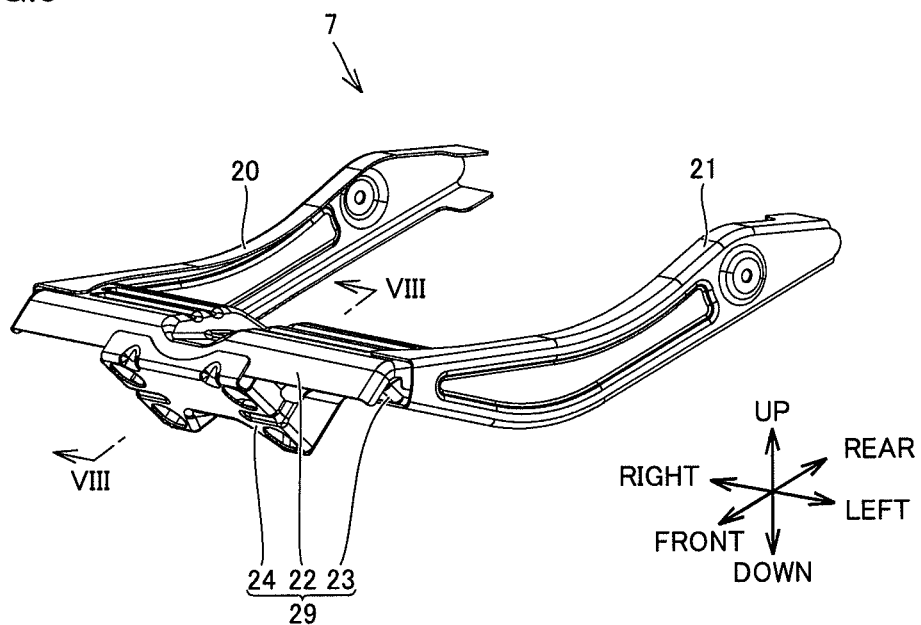
FIG. 3 and FIG. 4 are perspective views showing a cushion frame 7.
Figure 4:
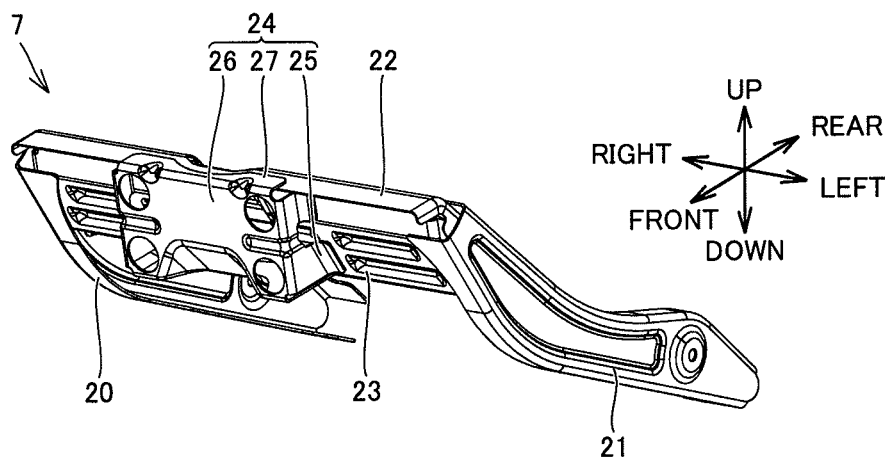

FIGS. 3 and 4 are perspective views showing cushion frame 7. Cushion frame 7 includes a side frame (a first side frame) 20, a side frame (a second side frame) 21, and an ottoman support portion 29.

Side frames 20 and 21 are formed to longitudinally extend in the front-rear direction of the seat. Side frame 20 and side frame 21 are arranged in the direction of width of the seat at a distance from each other.

Figure 5:
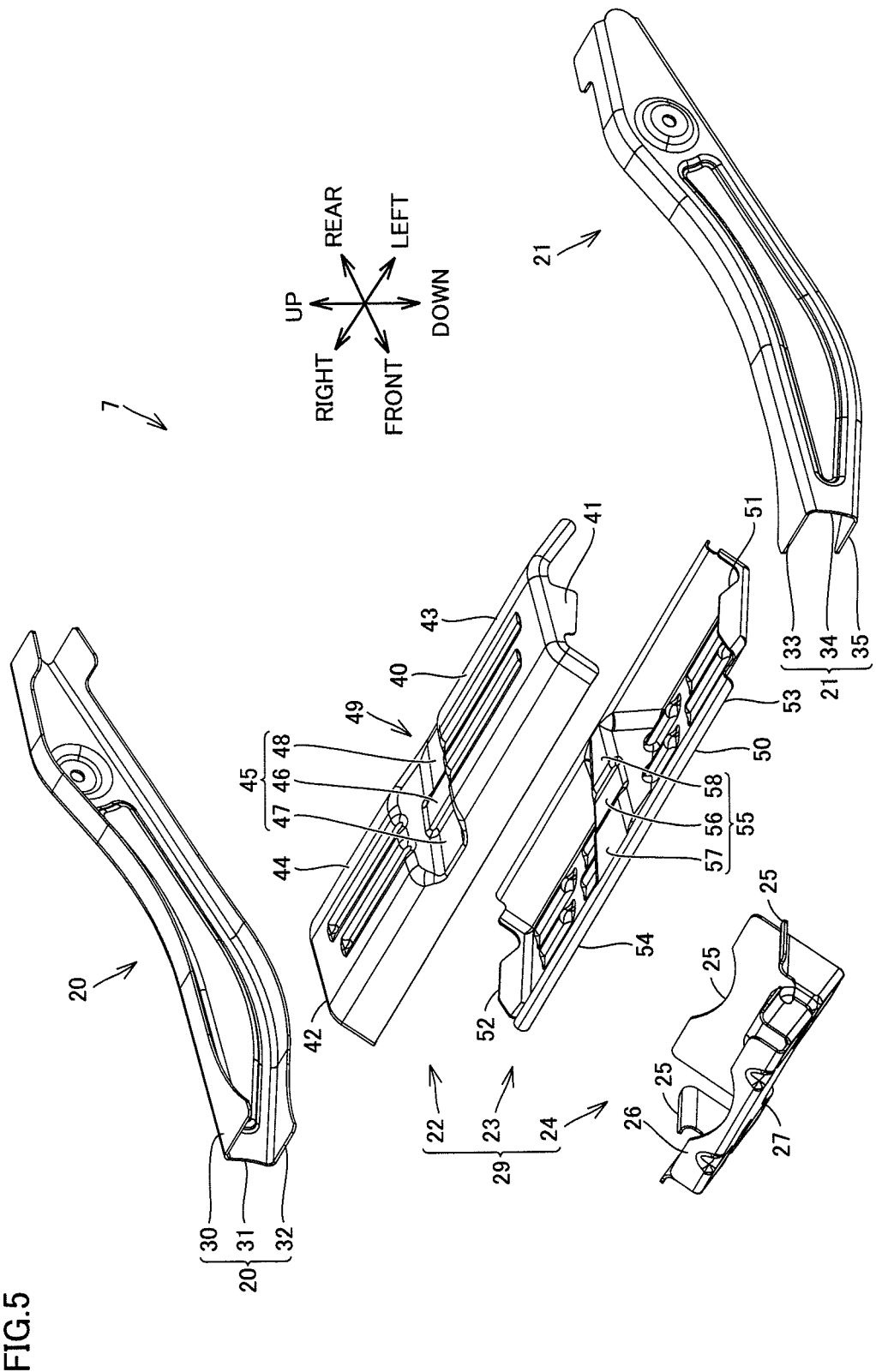
FIG. 5 is an exploded perspective view showing cushion frame 7.

FIG. 5 is an exploded perspective view showing cushion frame 7. Side frame 20 includes an upper wall portion 30, a sidewall portion 31, and a lower wall portion 32. Sidewall portion 31 connects a right side of upper wall portion 30 and a right side of side frame 21 to each other, and side frame 20 is formed to open to the left in the direction of width of the seat.

Side frame 21 includes an upper wall portion 33, a sidewall portion 34, and a lower wall portion 35. Sidewall portion 34 connects a left side of upper wall portion 33 and a left side of lower wall portion 35 to each other. Side frame 21 is formed to open to the right in the direction of width of the seat.

Ottoman support portion 29 includes an upper panel (an upper member) 22, a lower panel (a lower member) 23, and a mount 24.

Upper panel 22 is formed like a plate. Upper panel 22 includes a top plate 40 and side plates 41 and 42.

Top plate 40 is formed to be long in the direction of width of the seat. Top plate 40 includes support plates 43 and 44 and a connection portion (a first connection portion) 45.

Support plate 43 is provided on a side of side frame 21 and support plate 44 is provided on a side of side frame 20. Support plate 43 and support plate 44 support cushion pad 8 provided on the side of the upper surface of cushion frame 7.

A recess portion 49 is provided between support plate 44 and support plate 43. Recess portion 49 is provided to extend in the front-rear direction of the seat and provided to be recessed toward lower panel 23.

When upper panel 22 provided with recess portion 49 is compared with upper panel 22 without recess portion 49, upper panel 22 provided with recess portion 49 is higher in rigidity.

Connection portion (first connection portion) 45 is formed in a bottom portion of recess portion 49. Connection portion 45 includes a front-side connection portion (a first front-side connection portion) 47, a rear-side connection portion (a first rear-side connection portion) 48, and an intermediate portion (a first intermediate portion) 46. Front-side connection portion 47 and rear-side connection portion 48 are formed at a distance from each other in the front-rear direction of the seat. Intermediate portion 46 is formed between front-side connection portion 47 and rear-side connection portion 48.

Figure 6:
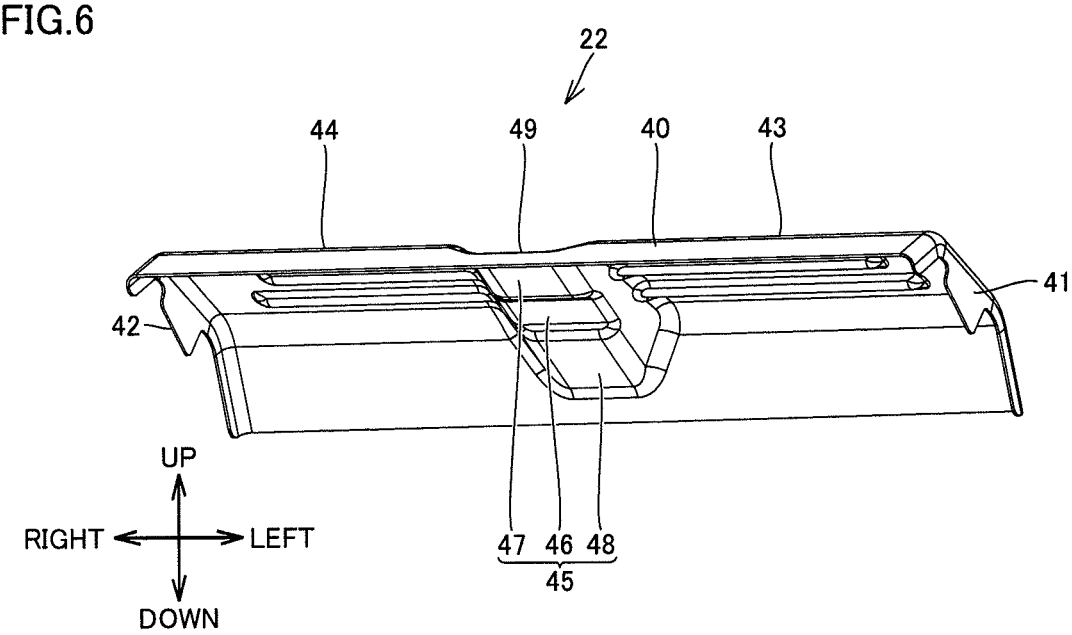
FIG. 6 is a perspective view of an upper panel 22 from below.

FIG. 6 is a perspective view of upper panel 22 from below. Front-side connection portion 47 and rear-side connection portion 48 are formed to protrude downward and intermediate portion 46 is formed to protrude upward relative to front-side connection portion 47 and rear-side connection portion 48.

When connection portion 45 having intermediate portion 46 formed is compared with connection portion 45 without intermediate portion 46, connection portion 45 having intermediate portion 46 formed is higher in rigidity.

Side plate 42 is formed in the right side of support plate 44 and formed to extend downward from the right side of support plate 44. Side plate 41 is formed in the left side of support plate 43. Side plate 41 is formed to extend downward from the left side of support plate 43.

Referring back to FIG. 5, the right side of support plate 44 and side plate 42 are inserted in side frame 20. The right side of support plate 44 and a portion located around the same are welded to upper wall portion 30 of side frame 20. The left side of support plate 43 and side plate 41 are inserted in side frame 21. The left side of support plate 43 and a portion located around the same are welded to upper wall portion 33 of side frame 21.

Thus, the right side portion of upper panel 22 is connected to side frame 20 and the left side portion of upper panel 22 is connected to side frame 21. The right side portion (a first side portion) of upper panel 22 is formed by the right side of support plate 44 and side plate 42. The left side portion (a second side portion) of upper panel 22 is formed by the left side of support plate 43 and side plate 41.

Lower panel 23 includes a bottom plate 50 and side plates 51 and 52. Bottom plate 50 includes a support plate 53, a support plate 54, and a connection portion (a second connection portion) 55, and a recess portion 59 is provided in bottom plate 50. Support plate 53 is provided on the left side in the direction of width of the seat and support plate 54 is provided on the right side in the direction of width of the seat. Mount 24 is attached to support plate 53 and support plate 54.

Figure 7:
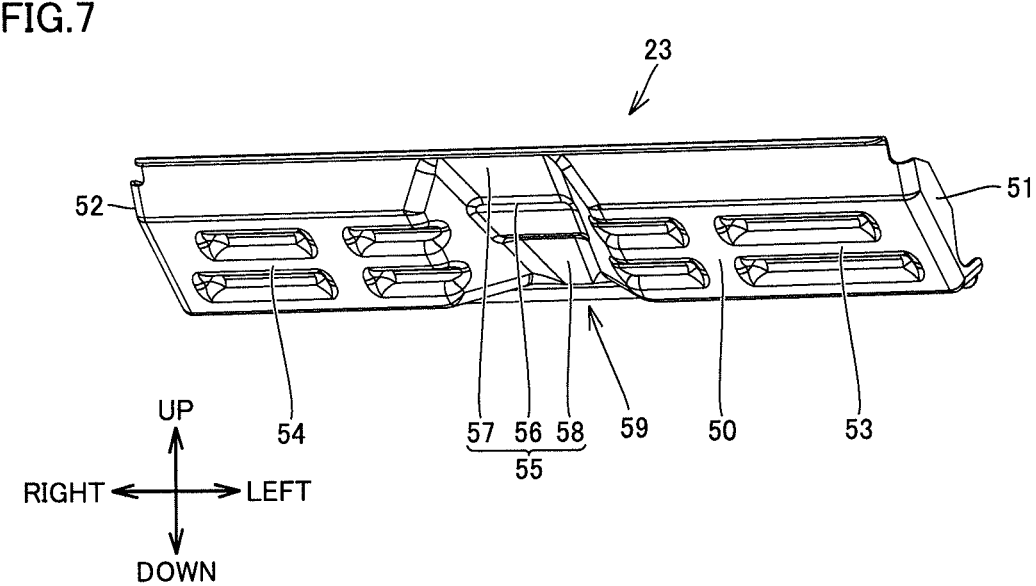
FIG. 7 is a perspective view of a lower panel 23 from below.

FIG. 7 is a perspective view of lower panel 23 from below. Recess portion 59 is provided between support plate 53 and support plate 54. Recess portion 59 is provided as being recessed toward upper panel 22 and provided to be recessed upward.

When lower panel 23 provided with recess portion 59 is compared with lower panel 23 without recess portion 59, lower panel 23 provided with recess portion 59 is higher in rigidity.

Connection portion (second connection portion) 55 is formed in an upper end wall of recess portion 59. Connection portion (second connection portion) 55 includes a front-side connection portion (a second front-side connection portion) 57, a rear-side connection portion (a second rear-side connection portion) 58, and an intermediate portion (a second intermediate portion) 56. Front-side connection portion 57 and rear-side connection portion 58 are formed at a distance from each other in the front-rear direction of the seat. Intermediate portion 56 is formed between front-side connection portion 57 and rear-side connection portion 58.

Intermediate portion 56 is formed to protrude downward from front-side connection portion 57 and rear-side connection portion 58. When connection portion 55 provided with intermediate portion 56 is compared with connection portion 55 without intermediate portion 56, connection portion 55 provided with intermediate portion 56 is higher in rigidity.

Side plate 51 is formed to extend upward from the left side of support plate 53 and side plate 52 is formed to extend upward from the right side of support plate 54.

In FIG. 5, the right side of support plate 54 and side plate 52 are inserted in side frame 20. Support plate 54 is welded to lower wall portion 32 of side frame 20.

The left side of support plate 53 and side plate 51 are inserted in side frame 21. Support plate 53 is welded to lower wall portion 35.

Thus, the right side (a third side portion) of lower panel 23 is connected to side frame 20 and the left side portion (a fourth side portion) of lower panel 23 is connected to side frame 21. The right side portion of lower panel 23 is formed by the right side of support plate 54 and side plate 52. The left side portion of lower panel 23 is formed by the left side of support plate 53 and side plate 51.

In FIGS. 4 and 5, mount 24 includes a fixation plate 27, a welded piece 25, and an engagement piece 26.

Fixed portion 9 of ottoman 4 is fixed to fixation plate 27. Welded piece 25 is welded to lower panel 23. Engagement piece 26 is engaged with and welded to upper panel 22.

Figure 8:
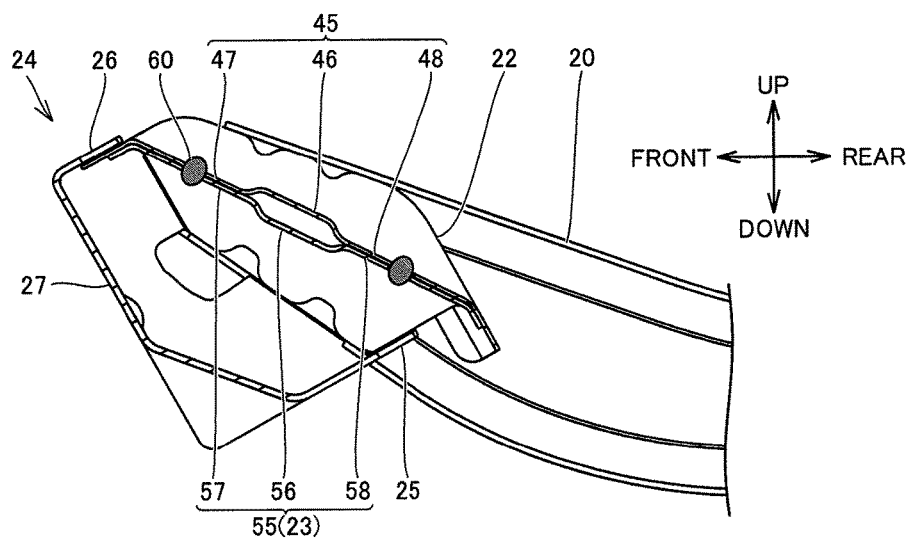
FIG. 8 is a cross-sectional view along the line VIII-VIII shown in FIG. 3.

FIG. 8 is a cross-sectional view along the line VIII-VIII shown in FIG. 3. Connection portion 45 of upper panel 22 and connection portion 55 of lower panel 23 are connected to each other by a welding portion 60. Specifically, front-side connection portion 47 and front-side connection portion 57 are welded to each other, and rear-side connection portion 48 and rear-side connection portion 58 are welded to each other. Intermediate portion 46 of connection portion 45 and intermediate portion 56 of connection portion 55 are distant from each other.

In vehicle seat 1 constructed as above, ottoman 4 is attached to mount 24 and a load of ottoman 4 is applied to mount 24.

Mount 24 is welded to lower panel 23 and a load of mount 24 is applied to lower panel 23. The load applied to lower panel 23 is born by side frames 20 and 21 through opposing side portions of lower panel 23.

Since connection portion 55 of lower panel 23 and connection portion 45 of upper panel 22 are connected to each other, a load applied to lower panel 23 is transmitted to upper panel 22 through connection portions 55 and 45.

The load transmitted to upper panel 22 is born by side frames 20 and 21 through opposing end portions of upper panel 22.

Since lower panel 23 is thus supported not only by side frames 20 and 21 but also by upper panel 22, large deformation of lower panel 23 can be suppressed.

Since upper panel 22 is provided with recess portion 49, it is high in rigidity. Since lower panel 23 is provided with recess portion 59, it is high in rigidity. Therefore, even though a load from ottoman 4 is applied to upper panel 22 and lower panel 23, large deformation of upper panel 22 and lower panel 23 can be suppressed.

Since intermediate portions 46 and 56 are provided in connection portions 45 and 55, respectively, connection portions 45 and 55 are high in rigidity. Therefore, even though a large load is applied to connection portion 45 and connection portion 55, large deformation of connection portions 45 and 55 and a portion around the same can be suppressed.

Cushion pad 8 is supported by upper panel 22 formed like a plate. As compared with an example in which upper panel 22 is formed like a pipe, an occupant is less likely to feel upper panel 22 and occupant's feeling in sitting is better.

The present disclosure is summarized as follows.

A vehicle seat according to the present disclosure includes a seat cushion on which an occupant sits and an ottoman provided on a front side of the seat cushion. The seat cushion includes a first side frame and a second side frame arranged at a distance from each other in a direction of width of a seat and an ottoman support portion provided between the first side frame and the second side frame on a side of front end portions of the first side frame and the second side frame. The ottoman support portion includes an upper member, a lower member arranged below the upper member at a distance from the upper member, and a mount connected to the lower member and provided with the ottoman. The upper member includes a first side portion connected to the first side frame, a second side portion connected to the second side frame, and a first connection portion provided between the first side portion and the second side portion. The lower member includes a third side portion connected to the first side frame, a fourth side portion connected to the second side frame, and a second connection portion provided between the third side portion and the fourth side portion. The first connection portion of the upper member and the second connection portion of the lower member are connected to each other.

According to the vehicle seat, the upper member and the lower member are connected to each other with the first connection portion and the second connection portion being interposed.

Therefore, a self weight of the ottoman applied to the lower member is transmitted not only to the lower member but also to the upper member through the first connection portion and the second connection portion. The lower member and the upper member are supported by the first side frame and the second side frame. Thus, the lower member is supported not only by the first side frame and the second side frame but also by the upper member so that large deformation of the lower member is suppressed.

The first connection portion is formed to protrude toward the lower member and the second connection portion is formed to protrude toward the upper member.

According to the construction above, since the first connection portion is formed, the upper member is high in rigidity. Since the second connection portion is formed, the lower member is also high in rigidity. Therefore, deformation of the ottoman support portion is suppressed.

The upper member is implemented by an upper panel in a form of a plate and the lower member is implemented by a lower panel in a form of a plate.

According to the construction, the seat cushion is arranged on the upper panel. When an occupant sits on the seat cushion, the occupant is less likely to feel the upper panel and comfort in sitting can be improved.

The first connection portion includes a first front-side connection portion and a first rear-side connection portion arranged at a distance from each other in a front-rear direction of the seat and a first intermediate portion located between the first front-side connection portion and the first rear-side connection portion. The second connection portion includes a second front-side connection portion and a second rear-side connection portion arranged at a distance from each other in the front-rear direction of the seat and a second intermediate portion located between the second front-side connection portion and the second rear-side connection portion. The first front-side connection portion and the second front-side connection portion are connected to each other. The first rear-side connection portion and the second rear-side connection portion are connected to each other. The first intermediate portion is formed to protrude upward. The second intermediate portion is formed to protrude downward.

According to the construction, the first connection portion and the second connection portion are formed to provide a projecting and recessed shape and the first connection portion and the second connection portion are high in rigidity. Therefore, even though a self weight of the ottoman is applied to the first connection portion and the second connection portion, deformation of the first connection portion and the second connection portion can be suppressed.

Though embodiments of the present disclosure have been described, it should be understood that the embodiments disclosed herein are illustrative and non-restrictive in every respect. The scope of the present invention is defined by the terms of the claims and is intended to include any modifications within the scope and meaning equivalent to the terms of the claims.

What is claimed is:

1. A vehicle seat comprising:
a seat cushion which supports an occupant; and
an ottoman provided on a front side of the seat cushion,
the seat cushion including
a first side frame and a second side frame arranged at a distance from each other in a direction of width of the seat, and
an ottoman support portion provided between the first side frame and the second side frame on a side of front end portions of the first side frame and the second side frame,
the ottoman support portion including
an upper member,
a lower member arranged below the upper member at a distance from the upper member, and
a mount connected to the lower member and provided with the ottoman,
the upper member including
a first side portion connected to the first side frame,
a second side portion connected to the second side frame, and
a first connection portion provided between the first side portion and the second side portion,
the lower member including
a third side portion connected to the first side frame,
a fourth side portion connected to the second side frame, and
a second connection portion provided between the third side portion and the fourth side portion, and
the first connection portion of the upper member and the second connection portion of the lower member being connected to each other.

2. The vehicle seat according to claim 1, wherein
the first connection portion is formed to protrude toward the lower member and the second connection portion is formed to protrude toward the upper member.

3. The vehicle seat according to claim 1, wherein
the upper member is implemented by an upper panel in a form of a plate and the lower member is implemented by a lower panel in a form of a plate.

4. The vehicle seat according to claim 1, wherein
the first connection portion includes
a first front-side connection portion and a first rear-side connection portion arranged at a distance from each other in a front-rear direction of the seat, and
a first intermediate portion located between the first front-side connection portion and the first rear-side connection portion,
the second connection portion includes
a second front-side connection portion and a second rear-side connection portion arranged at a distance from each other in the front-rear direction of the seat, and
a second intermediate portion located between the second front-side connection portion and the second rear-side connection portion,
the first front-side connection portion and the second front-side connection portion are connected to each other,
the first rear-side connection portion and the second rear-side connection portion are connected to each other, the first intermediate portion is formed to protrude upward, and the second intermediate portion is formed to protrude downward.

\* \* \* \* \*